C. E. REED.
REVOLVING CUTTER ROTARY BORING DRILL.
APPLICATION FILED NOV. 27, 1914.
1,159,087.
Patented Nov. 2, 1915.
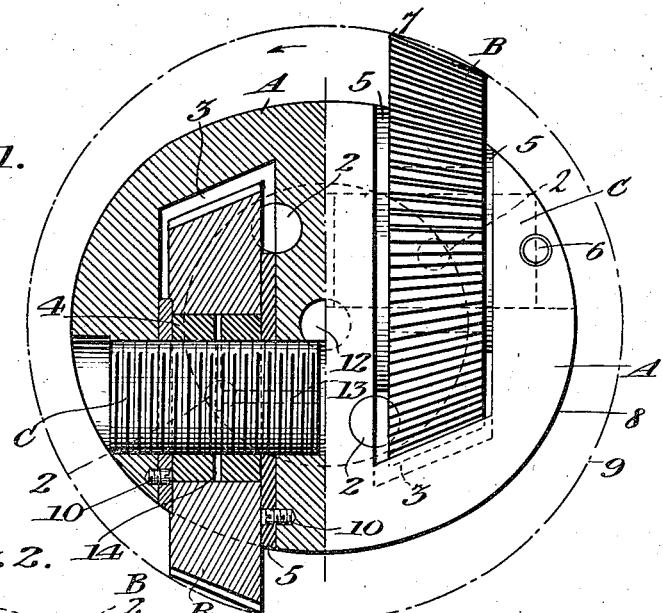
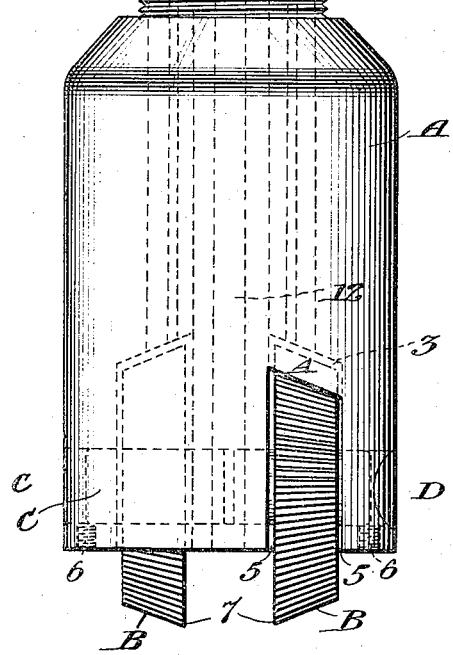
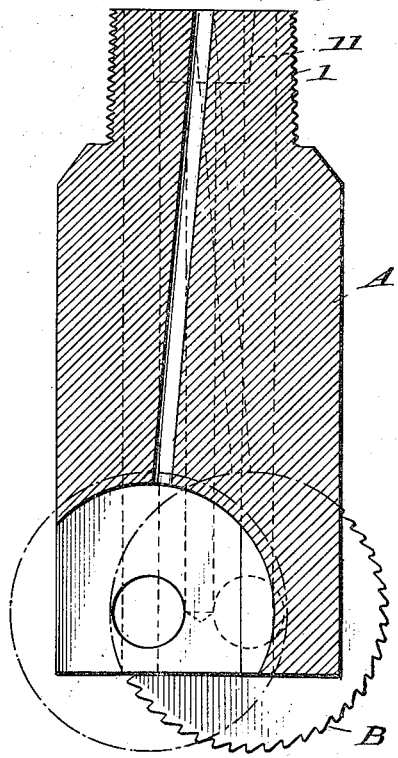
Witnesses:
Inventor:
Clarence Edward Reed

UNITED STATES PATENT OFFICE.

CLARENCE EDWARD REED, OF HOUSTON, TEXAS.

REVOLVING-CUTTER ROTARY BORING-DRILL.

1,159,087. Specification of Letters Patent. Patented Nov. 2, 1915.

Application filed November 27, 1914. Serial No. 874,338.

*To all whom it may concern:*

Be it known that I, CLARENCE EDWARD REED, a citizen of the United States of America, residing at No. 516 Pacific avenue, in the city of Houston, State of Texas, United States of America, have invented a certain new and useful Improvement in Revolving-Cutter Rotary Boring-Drills for Use with the Rotary System Employed in Drilling Wells, and do hereby declare the nature of this invention, of which the following is a full, clear, and exact description, such as will enable others skilled in the art to which it appertains to make and use the same.

This invention relates to rotary boring drills and particularly to drills of that type which are provided with cutters of a flat, circular plate shape.

One object of my invention is to provide a drill of the type referred to having cutters of a flat circular plate shape so mounted that in practical operation of the drill the friction of the material being cut will cause the cutters to revolve on their bearings without binding. Binding causes the cutters to wear flat at one spot and renders the drill useless.

Another object is to mount such cutters in the head so that the cutter will stand in a vertical plane to the axis of the well being drilled and turn, in practical operation, on a bushing carried by a shaft or pin supported by the head on both sides of the cutter.

Another object is to so shape the head of the drill that the cutters revolving in soft material like gumbo, clay and shale will be cleaned of the material sticking to the sides of the cutter as the cutter revolves in the slotted head.

Another object is to provide a drill head in which the water holes for flushing the waste material can be so placed that the thick mud formed by drilling soft formations cannot enter and clog the passage, causing the drill to "ball up" and quit cutting by reason of the material packing around the cutters.

Still another object is to provide a very strong, serviceable drill head of new and novel construction that can be made cheaply of simple and few parts, easily removed and replaced when necessary on account of wear.

Other objects and desirable features of my invention will be hereinafter pointed out and are shown by the drawings.

Figure 1 of the drawings is a part section on the line C—D of Fig. 2 and a part bottom plan view of a rotary drill constructed in accordance with my invention. Fig. 2 is a side elevational view. Fig. 3 is a vertical sectional view.

Referring to the drawings which illustrate the preferred form of my invention, A designates the head which preferably consists of a bar of metal, the upper end of which 1 is screw-threaded for connecting the drill stem or operating member, not shown, through which water is introduced into the hole to flush out material cut by the drill. Water holes in the head are shown at 2. These water holes emerge: one over each cutter to wash the teeth of cutter clean, and one at the side of each cutter, deep in the slot back of the washer 5. This location prevents mud in the well clogging the holes, and also carries the water down so it impinges on the material cut under the mass of waste material to be flushed out and upward.

Cutters B capable of rotation are mounted in the head A so as to cut, disintegrate and crush the material when the drill head is rotated, and in the preferred form of my invention as herein shown the head of the drill is provided with two cutters that are mounted in the head in slots 3 cut in parallel planes parallel to the longitudinal axis of the drill head. By mounting the cutters in this manner the shaft or pin supporting the bearing material 4 on which cutters rotate can be supported at both ends by the body of the drill head. This is a very great advantage and improvement, both for strength and to facilitate revolution of the cutters. Revolution of the cutters is an absolute necessity to the success of this type of drill.

The shaft or pin C is locked in position by set screw 6 and cannot come out. The cutters therefore cannot be lost in the well. The cutters B are thick and heavy to successfully withstand the enormous stress set up in practical operations. The edges of the cutters are beveled to conform to the outline of the hole which will be concave in shape. In operation the cutter edge 7 shaves off the material from the concave surface of the hole. The cutter is beveled on the edge only enough to prevent dragging. Teeth are cut in the edge to facilitate rotation of the cutter.

The shaft or pin C is located through the slot, offset from the center of the head, so that the cutter projects beyond the metal of the drill head sufficient to cut ample clearance for the head and the casing or pipe which follows the drill.

On the drawings (Fig. 1) 8 indicates the circumference of drill head while 9 shows the circumference of hole cut by the drill. The arrow indicates direction of rotation.

In my invention, as shown by the drawings, all parts when assembled are contained within the drill head. The only parts extending beyond the body of the head are the heavy cutters B. The shaft or pin C is screw-threaded its entire length and its head is slotted so it can be screwed into or out of the head by means of a screwdriver or other similar tool. Bushings 4 of bronze or some other similar material, are preferably arranged between the cutters and the shaft or pin, and washers 5 are arranged between the cutters and the head. Dowels 10 hold the washers from turning and wearing the head.

In the drill shown in Fig. 2 the head is recessed at its upper end as at 11 and this recess is screw-threaded for connecting a lubricant holder, not shown, and ducts 12, 13 and 14 are formed in the head A, the shafts or pins C, and the bushing 4 to supply a lubricant to the bearing surface of the cutters.

My improved drill is very strong, compact, of few and simple parts, and can be manufactured at low cost. It is very efficient owing to the fact that the cutters are supported on both sides and only the section actually cutting is in contact with the material and mass of mud and waste material in the hole, which in all other drills of this class adheres to the cutters and prevents their rotating. As the driller says: "It balls up." In my invention the stresses set up in practical operation are carried to and meet the bearing surface on a perpendicular line. The cutters therefore use the friction of contact with bottom of hole to force their rotation and the enormous weight of the drill stem that is imposed on the cutters also meets the bearing surface of the cutters on a perpendicular line and does not bind the cutters as in drills with inclined spindles.

Having thus described my invention, what I claim as new and desire to secure by Letters Patent is:

1. A rotary boring drill comprising a cylindrical head, having formed in its lower end a pair of vertical parallel slots, each of said slots opening respectively only at its bottom and side, said slots extending through the outer walls of the head at opposite sides of its circumference, a pair of disk shaped cutters independently mounted in said slots with their cutting edges extending beyond the circumference of the head, substantially as described.

2. A rotary boring drill comprising a cylindrical head, formed with a pair of parallel vertical slots in its lower end, each of said slots extending inwardly from the opposite side of its circumference, said slots being formed at opposite sides of the longitudinal axis of the boring head, each of said slots being open only at the bottom and at one side, a pair of shafts suitably mounted transversely of said slots respectively, and a pair of disk-cutters rotatably mounted on the respective shafts, the cutting edges of said cutters extending out of said slots beyond the circumferential wall of the casing on opposite sides thereof, substantially as described.

3. A rotary boring drill having a single center bearing, two side bearings having slots open only at their bottoms and at one side, said slots being located between the side bearings and the center bearing, and vertically disposed parallel cutters pivotally mounted in the slots.

4. A rotary boring drill comprising a head formed with a pair of recesses therein, each of said recesses being open only at its bottom and at one side, a pair of cutting disks rotatably mounted in said recesses with their cutting edges extending beyond the outer wall of said head, said recesses having rear walls extending back of said disks with restricted spaces between a portion of the disks and the rear walls of the recess, and means for discharging fluid under pressure into said restricted spaces onto the cutting disks, the pressure being maintained by reason of said restrictions.

5. A rotary drill comprising a head formed with a pair of recesses therein, each of said recesses being open only at its bottom and at one side, a pair of cutting disks rotatably mounted in said recesses, said recesses having rear walls extending back of said disks with restricted spaces between a portion of said disks and the rear walls of the recesses, said head having passages for directing fluid under maintained pressure through said restricted areas, said passages being provided with discharge ports approximating in area the restricted spaces.

6. A rotary drill comprising a head with a pair of recesses therein, a pair of cutting disks rotatably mounted in said recesses, a pair of washers provided at the forward sides of said cutting disks, said recesses having rear walls extending back of said disks with restricted spaces between a portion of said disks and the rear walls of the recesses, and means for discharging fluid under maintained pressure into said restricted spaces onto the cutting disks.

7. A rotary boring drill comprising a head formed with a pair of recesses therein, each of said recesses being open only at its bottom and at one side and formed at opposite sides of the head, a pair of frusto-conical cutters rotatably mounted in said recesses with their cutting edges extending beyond the outer wall of said head, said cutters presenting their full thickness to the wall of the hole being cut.

In testimony whereof I hereunto affix my signature in the presence of two witnesses, this ninth day of November, 1914.

CLARENCE EDWARD REED.

Witnesses:
R. H. KELLEY,
C. S. POWERS.